United States Patent
Evans et al.

(10) Patent No.: US 9,860,160 B2
(45) Date of Patent: Jan. 2, 2018

(54) MULTIPATH SWITCHING USING PER-HOP VIRTUAL LOCAL AREA NETWORK CLASSIFICATION

(71) Applicant: STMICROELECTRONICS, INC., Coppell, TX (US)

(72) Inventors: Jonathan Evans, Dunwoody, GA (US); Lee Johnson, Lawrenceville, GA (US); Amit Kumar Aggarwal, Duluth, GA (US)

(73) Assignee: STMICROELECTRONICS, INC., Coppell, TX (US)

( * ) Notice: Subject to any disclaimer, the term of this patent is extended or adjusted under 35 U.S.C. 154(b) by 108 days.

(21) Appl. No.: 14/984,620

(22) Filed: Dec. 30, 2015

(65) Prior Publication Data
US 2017/0195213 A1    Jul. 6, 2017

(51) Int. Cl.
*H04L 12/66* (2006.01)
*H04L 12/707* (2013.01)
*H04L 12/801* (2013.01)
*H04L 12/46* (2006.01)

(52) U.S. Cl.
CPC .......... *H04L 45/24* (2013.01); *H04L 12/4641* (2013.01); *H04L 47/17* (2013.01)

(58) Field of Classification Search
CPC ...... H04L 45/24; H04L 12/4641; H04L 47/17
See application file for complete search history.

(56) References Cited

U.S. PATENT DOCUMENTS

| | | | | |
|---|---|---|---|---|
| 5,684,800 A * | 11/1997 | Dobbins | ............. | H04L 12/1886 370/401 |
| 5,959,990 A * | 9/1999 | Frantz | ................. | H04L 12/4645 370/392 |
| 5,963,556 A * | 10/1999 | Varghese | ................ | H04L 12/18 370/399 |
| 7,965,716 B2 * | 6/2011 | Takacs | ................ | H04L 12/4645 370/392 |
| 8,166,205 B2 * | 4/2012 | Farinacci | ............ | H04L 12/4641 370/389 |

(Continued)

OTHER PUBLICATIONS

Klein, P. Ph.D., "Convergent Digital Home Network Technical Presentation," IEEE P1905.1 Technical Presentation—IEEE 802.1 Plenary Meeting, San Diego, CA; Jul. 2012 (41 pgs.).

(Continued)

*Primary Examiner* — Phuc Tran
(74) *Attorney, Agent, or Firm* — Seed IP Law Group LLP

(57) ABSTRACT

A method and apparatus for multipath switching using per-hop virtual local area network (VLAN) remapping is disclosed. In the method and apparatus, a data packet is forwarded for transmission over one of a first port and a second port. The device identifies a VLAN ID of the data packet as a second VLAN ID and changes the second VLAN ID to a first VLAN ID. Then one or more criteria of a classification set entry for forwarding the data packet over the second port are evaluated. The data packet is forwarded over the second port if the criteria are met and the data packet is associated with the second VLAN ID. Alternatively, the data packet is forwarded over the first port and is associated with the first VLAN ID if a dynamic entry specifies the data packet is to be forwarded over the first port.

20 Claims, 8 Drawing Sheets

(56) References Cited

U.S. PATENT DOCUMENTS

| | | | |
|---|---|---|---|
| 8,645,576 B2 * | 2/2014 | Farinacci | H04L 12/4641 370/254 |
| 8,717,934 B2 * | 5/2014 | Bacthu | H04L 12/18 370/254 |
| 9,509,555 B2 * | 11/2016 | DeCusatis | H04L 41/0659 |
| 2006/0198323 A1 * | 9/2006 | Finn | H04L 12/462 370/256 |
| 2010/0061269 A1 * | 3/2010 | Banerjee | H04L 12/4675 370/254 |
| 2016/0173329 A1 * | 6/2016 | Latham | H04L 41/0806 370/254 |
| 2016/0173379 A1 * | 6/2016 | Heo | H04L 45/745 370/392 |

OTHER PUBLICATIONS

Goldfisher et al., "IEEE 1901 Access System: An Overview of Its Uniqueness and Motivation", *IEEE Communications Magazine*, Oct. 2010, pp. 150-157.

IEEE Computer Society, *IEEE Standard for Ethernet*, IEEE Standard 802.3, Dec. 28, 2012, 634 pages.

IEEE Computer Society, *IEEE Standard for Information technology—Telecommunications and information exchange between systems Local and metropolitan area networks—Specific requirements*, IEEE Standard 802.11, 2016, 3534 pages.

IEEE Computer Society, *IEEE Standard for Local and metropolitan area networks / Virtual Bridged Local Area Networks*, IEEE Standard 802.1Q, May 19, 2006, 303 pages.

Multimedia over Coax Alliance, *MoCA 2.0 Specification for Device RF Characteristics*, 2015, 34 pages.

* cited by examiner

MULTIPATH SWITCHING USING PER-HOP VIRTUAL LOCAL AREA NETWORK CLASSIFICATION

BACKGROUND

Technical Field

This application is directed to using per-hop virtual local area network classification to bridge data in a network of connected devices.

Description of the Related Art

Spanning Trees in Institute for Electrical and Electronics Engineering (IEEE) 802.1Q compliant devices permit a plurality of these devices to be connected in a Local Area Network (LAN) with a loop-free topology. However, this topology can result in suboptimal paths because useful links are left disabled in order to ensure only one path between each pair of devices. Furthermore, the tree topology does not permit load balancing or prioritizing the transmission of certain types of traffic, such as high priority data packets.

BRIEF SUMMARY

Devices, such as a television receiver, smart television, tablet, and wireless router in a home network, are connected to each other over a Local Area Network (LAN). Virtual LANs (VLANs), defined by IEEE 802.1Q, can be used to segregate physically-connected LANs into logical subgroups. Spanning Trees, through the Multiple Spanning Tree Protocol (MSTP), arrange the VLANs into a tree structure to prevent broadcast loops. In a tree structure, there can be only one communication path open between two devices on a given VLAN. For example, the smart television and the wireless router may be capable of communicating with one another using Wi-Fi and Ethernet, but only one of those connections may be used in the virtual local area network and the other must be unutilized or shutdown.

To increase the volume of data trafficked in the network, a second virtual local area network may be established. The second virtual local area network coexists with the already established virtual local area network, but does not use a spanning tree and has all available links enabled. The second virtual local area network has a separate identity to that of the existing virtual local area network. The second virtual local area network is used, where necessary, to provide an alternate path for data, such as priority data.

Data exchanged between devices of the network may at any point take a communication path enabled by the existing default virtual local area network or the second virtual local area network. A virtual network identifier, which is included in the data, is manipulated as the data takes alternative paths in the network. A classification set as defined by IEEE 1905.1 is used to direct data to the alternate path while traditional classification as defined by 802.1Q is used to direct data to the default path.

DETAILED DESCRIPTION

Figure 1:
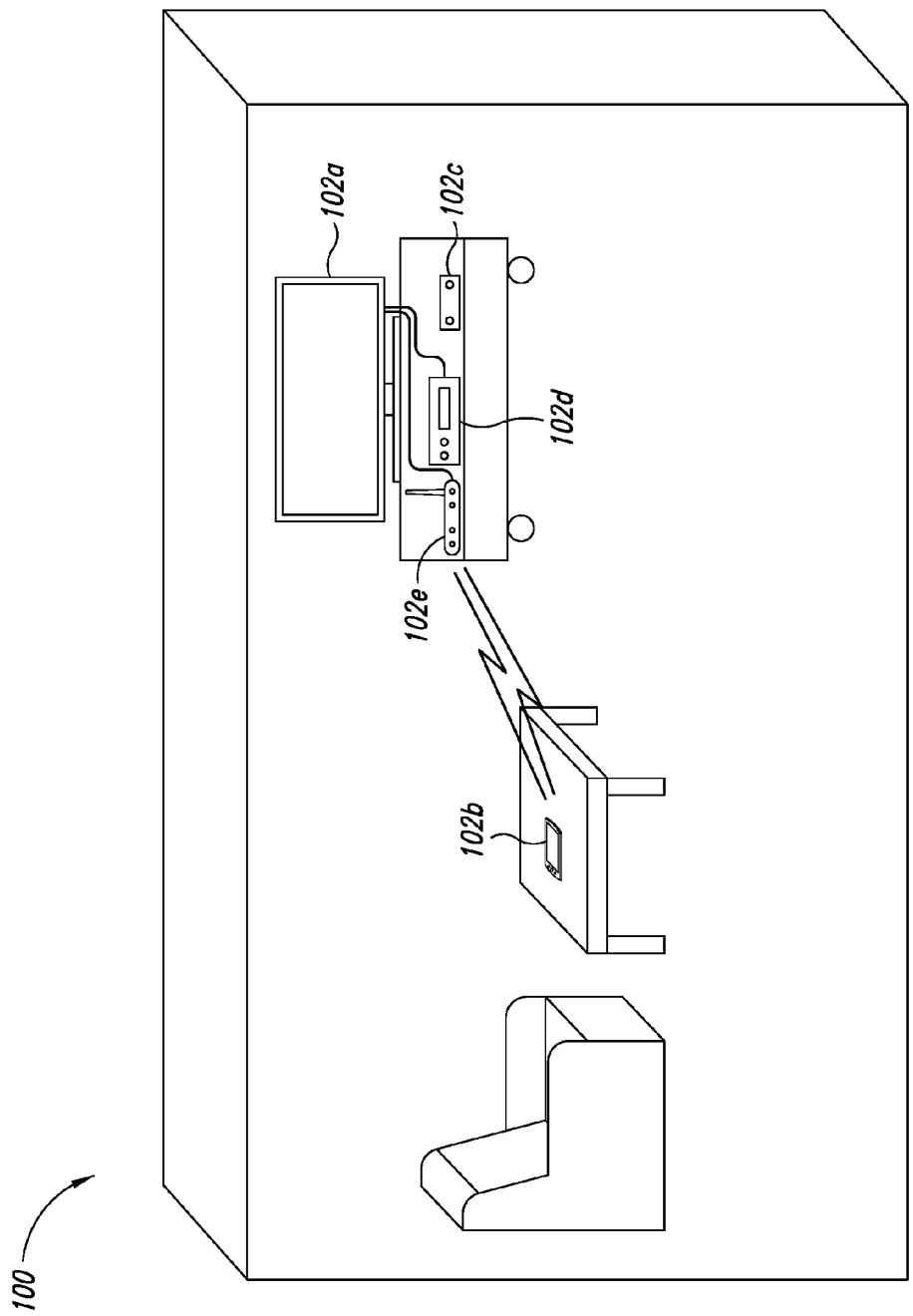
FIG. 1 shows an environment having a plurality of connected devices.

FIG. 1 shows an environment 100 having a plurality of connected devices 102. The devices 102 may include any type of device 102a that is capable of communicating with another device 102a. In FIG. 1, the plurality of connected devices include a smart television 102a, tablet 102b, set-top box 102c, a receiver 102d and a wireless/wired router 102e. The devices communicate with each other using any type of wireless or wired communication protocol. For example, the devices 102 may communicate using Institute for Electrical and Electronics Engineering (IEEE) 802.3 (also known as Ethernet), IEEE 802.11 (colloquially known as Wi-Fi), IEEE 1901 broadband over power lines (BPL) or the Multimedia over Coax Alliance (MoCA) communication protocol.

Each device 102 may communicate using one or more different protocols. For example, at one time instance, a device 102 may communicate with another device 102 using IEEE 802.11, whereas at another time instant, the device 102 may communicate with the other device using both IEEE 802.11 and 802.3. Further, at any time instance, two devices 102 may communicate with one another using two different communication protocols. Accordingly, multiple paths of communication between two devices 102 may exist at any point in time.

In the environment 100, the tablet 102b, set-top box 102c and wireless/wired router 102e are part of a first virtual local area network (VLAN) that is, for example, a wireless VLAN. The wireless/wired router 102e, smart television 102a and receiver 102d may be part of a second VLAN that is a wired VLAN. Data originating from the tablet 102b and addressed to the receiver 102d may take a path that traverses both VLANs. For example, the data may be transmitted from the tablet 102b to the wireless/wired router 102e over the first VLAN. Then the data may be transmitted from the wireless/wired router 102e to the receiver 102d over the second VLAN. Each VLAN is associated with a separate and distinct VLAN identifier (ID). The separate and distinct VLAN IDs in conventional systems prevent data packets from crossing over between VLANs. To enable seamless bridging and VLAN crossover of the data, VLAN ID remapping is performed as described herein using layer 2 switching/bridging techniques.

Figure 2:
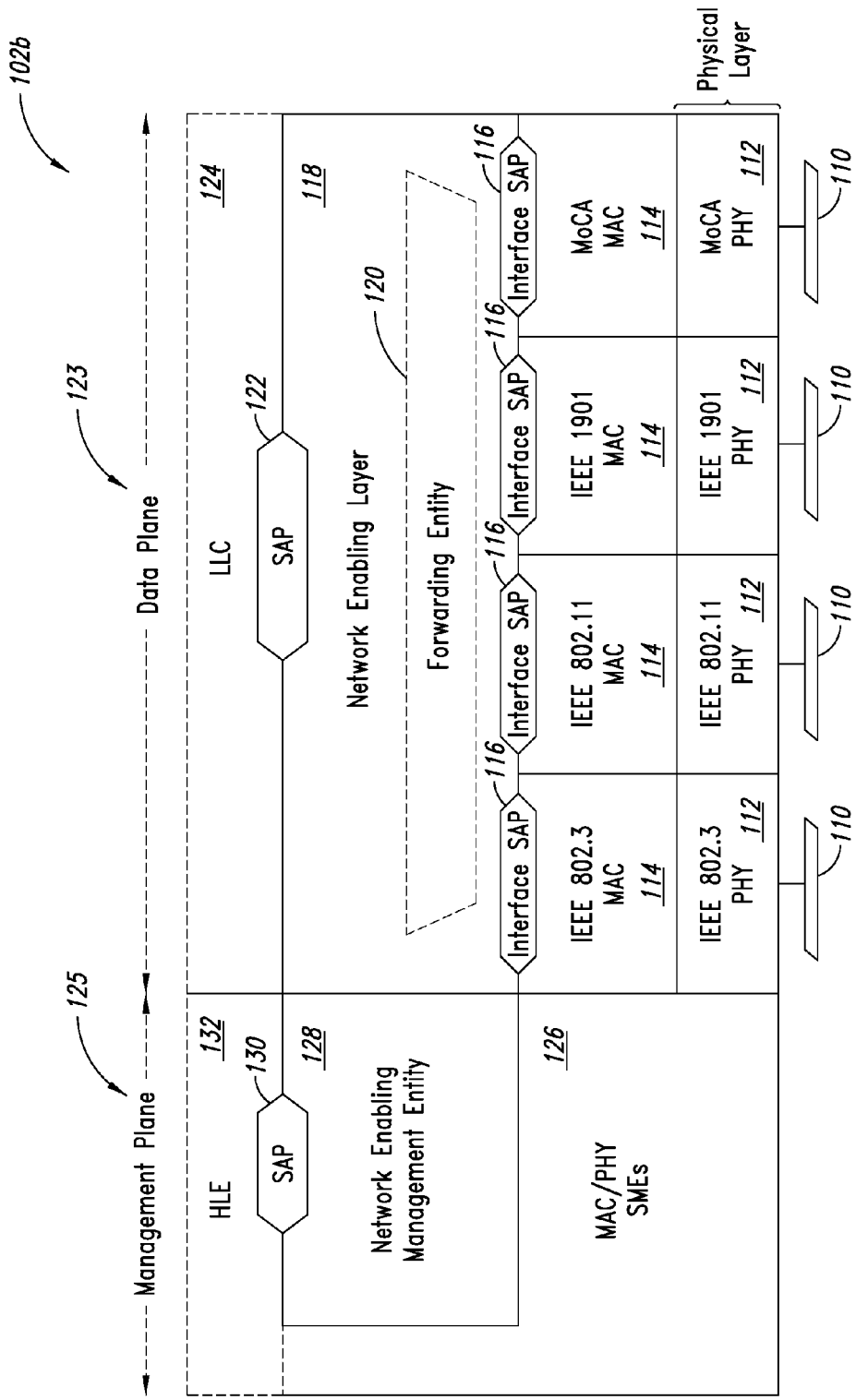
FIG. 2 shows an example of a connected device in accordance with at least one embodiment.

FIG. 2 shows an example of a connected device 102b in accordance with at least one embodiment. The device 102b includes a plurality of communication ports 110, a plurality of physical layer entities 112, a plurality of medium access control (MAC) entities 114, a plurality of interface service access points (SAPs) 116, a network enabling layer 118 including a forwarding entity 120, a service access point 122 and a logical link control (LLC) layer 124.

The plurality of communication ports 110, physical layer entities 112, medium access control entities 114 and service access points 116 and the network enabling layer 118, service access point 122 and logical link control layer 124 are part of a data plane 123 of the device 102b. The device 102b also has a management plane 125. The device 102b includes a station management entity (SME) 126 for the plurality of physical layer entities 112 and the plurality of medium access control entities 114, a network enabling management entity 128, a service access point 130 for the network enabling management entity 128 and higher layer entities 132 that are part of the management plane 125.

The data plane 123 determines the routing of packets by the device 102b. Data (for example, that is packetized in one or more data packets) arrives via the service access point 122 from the logical link control 124 and higher layers (not shown) at the network enabling layer 118. The network enabling layer 118 may be an IEEE 1905.1 protocol layer. A device that is compliant with the IEEE 1905.1 protocol may include the network enabling layer 118 to enable home networking using wireless and wireline protocols.

The forwarding entity 120 of the network enabling layer 118 identifies a port 110 which should be used to transmit the data. As described herein, each port 110 is associated with a particular communication protocol, such as IEEE 802.3 or IEEE 802.11, among others. Further, each port 110 has a corresponding physical layer entity 112 of the plurality of physical layer entities 112, a medium access control entity 114 of the plurality of medium access control entities 114 and an interface service access point 116 of the plurality of interface service access points 116.

Upon determining the communications protocol to be used to transmit the data, the forwarding entity 120 forwards the data to the interface service access point 116 corresponding to the protocol. It is noted that determining the communications protocol may also include determining the port 110 used for transmitting data. The data is provided to the medium access control entity 114 by the interface service access point 116. The medium access control entity 114 may perform certain operations on the data. For example, the medium access control entity 114 may remove or change fields of a header of the packet data. The medium access control entity 114 then provides the data to the physical layer entity 112. The physical layer entity 112 operates on the data, for example, by performing modulation and encoding and outputs the data over the communication port 110 associated with the communications protocol for transmission.

The management plane 125 controls the operation of the data plane 123. The network enabling management entity 128 receives control information over the service access point 132 from the higher layer entities 132. The network enabling management entity 128 communicates with the network enabling layer 118 and the forwarding entity 120 thereof to control the forwarding operation of the forwarding entity 120. Similarly, the medium access control and physical layer station management entity (SME) 126 controls the operations of the respective medium access control entities 114 and physical layer entities 112 of the communications protocols which the device 102b uses to communicate.

Figure 3:
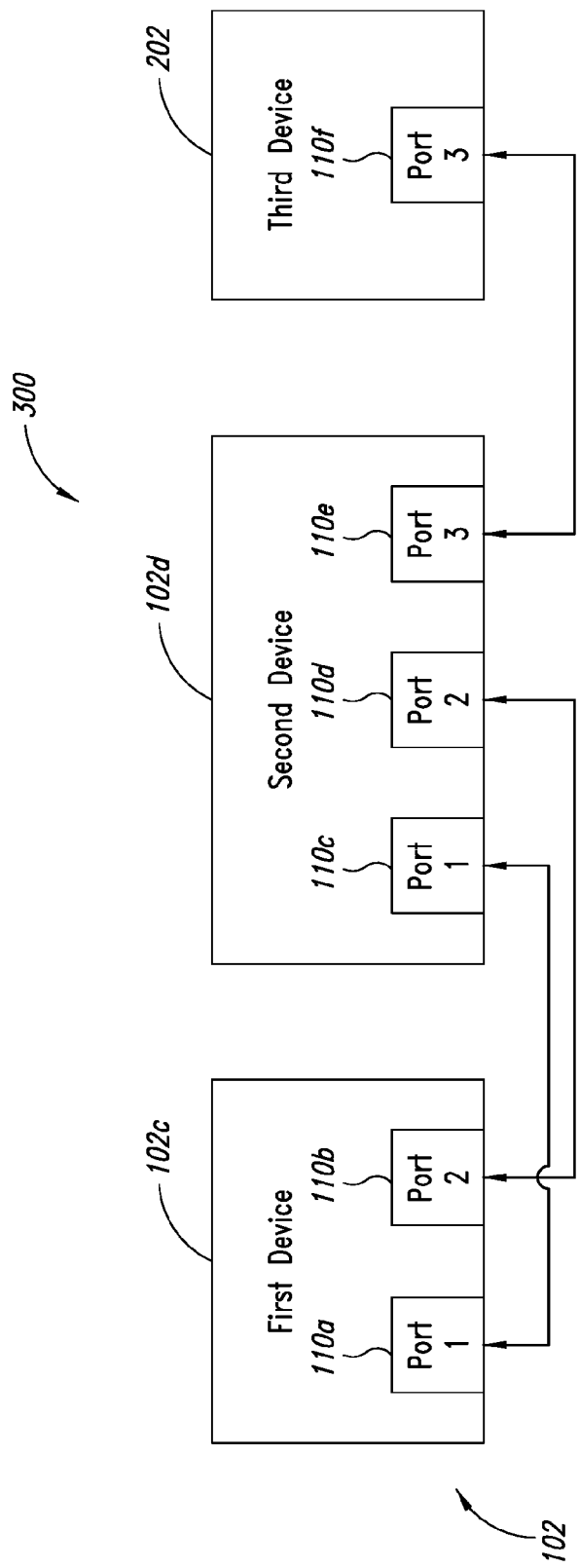
FIG. 3 shows an environment having a plurality of connected devices.

FIG. 3 shows an environment 300 having a plurality of connected devices 102. The devices 102 include a first device 102c, a second device 102d and a third device 202. The first device 102c can communicate using two different communication protocols. The first device 102c has a first port 110a and a second port 110b. The first port 110a transmits and receives data packets in accordance with the first communication protocol and the second port 110b transmits and receives data packets in accordance with the second communication protocol.

Similar to the first device 102c, the second device 102d has three ports; a first port 110c, a second port 110d and a third port 110e. The first port 110c is associated with the first communication protocol. The first port 110c of the second device 102d can be used to send data to and receive data from the first port 110a of the first device 102c. The second port 110d of the second device 102d is associated with the second communication protocol. The second port 110d of the second device 102d can be used to send data to and receive data from the second port 110b of the first device 102c.

The third port 110e of the second device 102d may be used to transmit and receive data in accordance with a third communication protocol that is different from the first and second communication protocols. While the second device 102d may not communicate with the first device 102c using the third port 110e, the third port 110e may be used to send data to or receive data from the third device 202. The third device 202 is equipped with a third port 110f for communication in accordance with the third communication protocol. Communication of data between the second device 102d and the third device 202 may occur over the respective third ports 110e, 110f.

Figure 4:
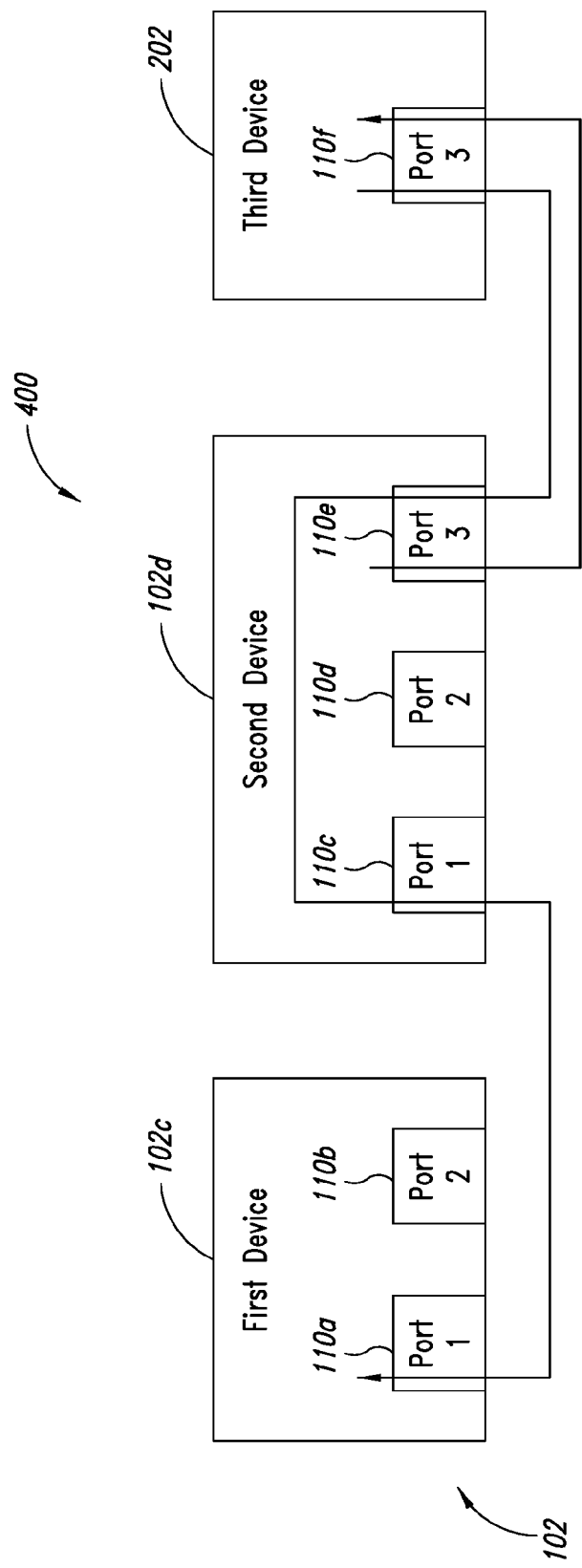
FIG. 4 shows a network in which a plurality of devices are connected.

FIG. 4 shows a network 400 in which a plurality of devices 110i are connected. Entities shown in FIG. 4 that are similar to those described with reference to FIG. 3 have the same reference numerals. The plurality of devices 110i are connected in accordance with a spanning tree topology, which may be a multiple spanning tree instance (MSTI). In the tree topology, the first device 102c and the second device 102d communicate using their respective first ports 110a, 110c. The second device 102d and the third device 202 communicate using their respective third ports 110e, 110f. The second ports 110b, 110d of the devices 102c, 102d are not used for trafficking data in the tree topology of the network 400. The first and third devices 102c, 202 are not equipped to communicate using the same protocol. Accordingly, traffic between the first and third devices 102c, 202 is bridged by the second device 102d.

The tree topology illustrated in the network 400 of FIG. 4 does not permit multipath communication. For example, the first and second devices 102c, 102d communicate using their respective first ports 110a, 110c but do not communicate at the same time using their respective second ports 110b, 110d. The spanning tree topology of the network 400 has a unique virtual local area network (VLAN) identifier (VID) that is denoted as VID1 in FIG. 4 and also referred to herein as VLAN1.

Data communicated over VLAN1 may include in its packet header the ID of the VLAN (i.e., VID1). In conventional routing systems, the data may not be bridged (for example, using layer 2 VLAN remapping) over other VLANs having different identities.

The devices of the network 400 may be equipped with multipath communication (i.e., the ability to concurrently communicate using two different ports or communications protocols). Multipath communication load balances traffic over available paths in the network 400 and reduces routing latency in the network 400. Furthermore, multipath communication increases the throughput of data between the first device 102c and the second device 102d. For example, if the devices 102c, 102d communicate concurrently using IEEE 802.11 and IEEE 802.3, the volume of data communicated between the devices 102c, 102d is increased as compared to only communicating using IEEE 802.11 or IEEE 802.3. Instead of the tree topology shown in FIG. 4, multipath communication results in a mesh topology being overlaid atop the tree topology.

Figure 5:
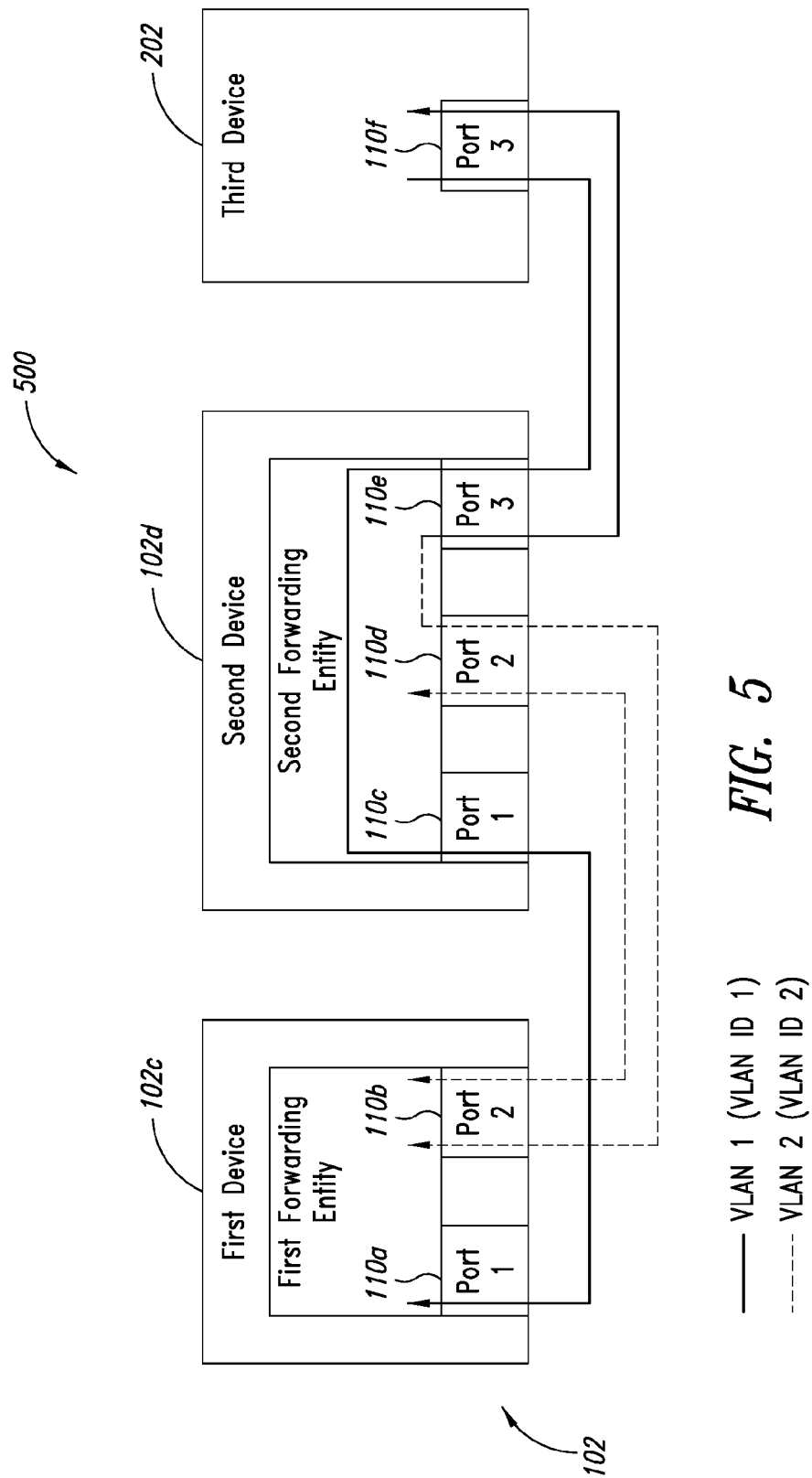
FIG. 5 shows a network in which a plurality of devices are connected using two VLANs.

FIG. 5 shows a network 500 in which a plurality of devices 102 are connected using two VLANs. Entities shown in FIG. 5 that are similar to those described with reference to FIG. 3 have the same reference numerals. In addition, the first device 102c includes a first forwarding entity 120a and the second device 102d includes a second forwarding entity 120b. The forwarding entities 120a, 120b evaluate packet data and determine the port over which data should be transmitted. The forwarding entities 120a, 120b accordingly are traffic arbiters for each device 102c, 102d.

In addition to the communication paths between the devices 102c, 102d, 202 already existing in the network 500 by virtue of the configured spanning tree VLAN (whose VLAN ID is 1), the network 500 also has a multipath VLAN (whose VLAN ID is 2) overlaid atop the spanning tree. The multipath VLAN is used for bridging certain types of data that meet a criterion.

The spanning tree VLAN forwards data between the first device 102c and the second device 102d over the first ports 110b, 110c of the respective devices 102c, 102d. Further, data between the second device 102d and the third device 202 is forwarded over the third ports 110e, 110f of the respective devices 102d, 202. These ports may be in a learning and forwarding state, whereby the learning state dictates that return traffic is reversely forwarded in an opposite manner as the forward path. The spanning tree VLAN blocks the second port 110b of the first device 102c and the second port 110d of the second device 102d from bridging traffic between the devices 102c, 102d.

The multipath VLAN complements the spanning tree VLAN and utilizes the blocked ports 110b, 110d for trafficking data between the first device 102c and the second device 102d. The multipath VLAN may be in a forwarding and non-learning state. Accordingly, the devices 102c, 102d may forward traffic on the multipath VLAN. Reverse traffic may be independently evaluated for determining a port on which it will be bridged. In the non-learning state, reverse traffic does not necessarily take the same route as the forward traffic. Data bridged between the devices 102c, 102d, 202 may at various points in time take a communication path provided by the spanning tree VLAN or the multipath VLAN. The devices 102c, 102d, 202 described with reference to FIG. 5 may each have bridging table entries that dictate the manner in which the devices 102c, 102d, 202 bridge data.

The first device 102c has the following bridging table entry that includes a classification set entry and dynamic entry:

First Device:
Classification Set Entry:
Priority 4 traffic addressed to second or third devices→Port 2
Dynamic Entry:
All other traffic to second or third devices→Port 1

The classification set entry supersedes the dynamic entry. The classification set entry pertains to the multipath VLAN and specifies that priority four traffic addressed to the second or third devices 102d, 202 is forwarded to the second port 110b. The dynamic entry, on the other hand, pertains to the spanning tree VLAN and specifies that all other traffic to the second or third devices 102d, 202 is forwarded to the first port 110a.

Similarly, the second device 102d has bridging table entries that include a classification set entry and a dynamic entry. The bridging table entries of the second device 102d are as follows:

Second Device:
Classification Set Entry:
Priority 4 traffic addressed to first device→Port 2
Dynamic Entry:
All other traffic to first device→Port 1
All traffic to third device→Port 3

The classification set entry supersedes the dynamic entry. The classification set entry specifies that priority four traffic addressed to the first device 102c is forwarded to the second port 110d. The dynamic entry pertains to the spanning tree VLAN and specifies that all other traffic to the first device 102c is forwarded to the first port 110c of the second device 102d and all traffic to the third device 202 is forwarded to the third port 110e of the second device 102d.

The third device 202, on the other hand, is not part of the multipath VLAN. The bridging table entry of the third device 202 includes a dynamic entry that specifies that all traffic is forwarded to the third port 110f of the third device 202. The bridging table entry of the third device 202 is as follows:

Third Device:
Dynamic Entry:
All traffic to first device→Port 3
All traffic to second device→Port 3

When data is bridged between VLANs, the VLANs may use the same communication protocol or different communication protocols. For example, data may be bridged between two VLANs having different VLAN IDs that use the same communication protocol, such as IEEE 802.11. Alternatively, data may be bridged between two VLANs having different VLAN IDs that use different communication protocols, whereby, for example, one VLAN may use the IEEE 802.11 protocol and another VLAN may use IEEE 802.3.

Figure 6A:
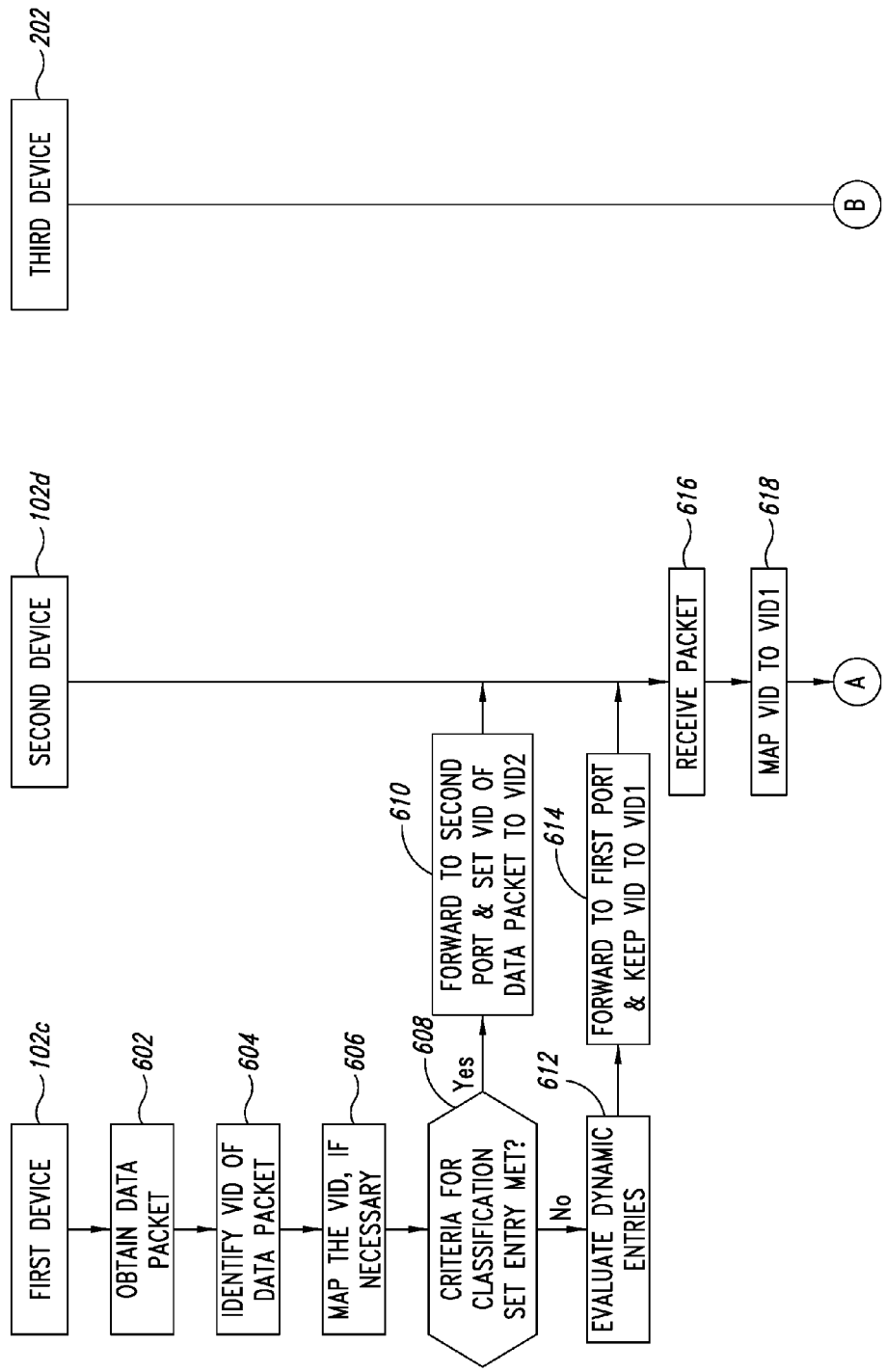
FIGS. 6A and 6B show a flow diagram of packet bridging in the network described with reference to FIG. 5.
Figure 6B:
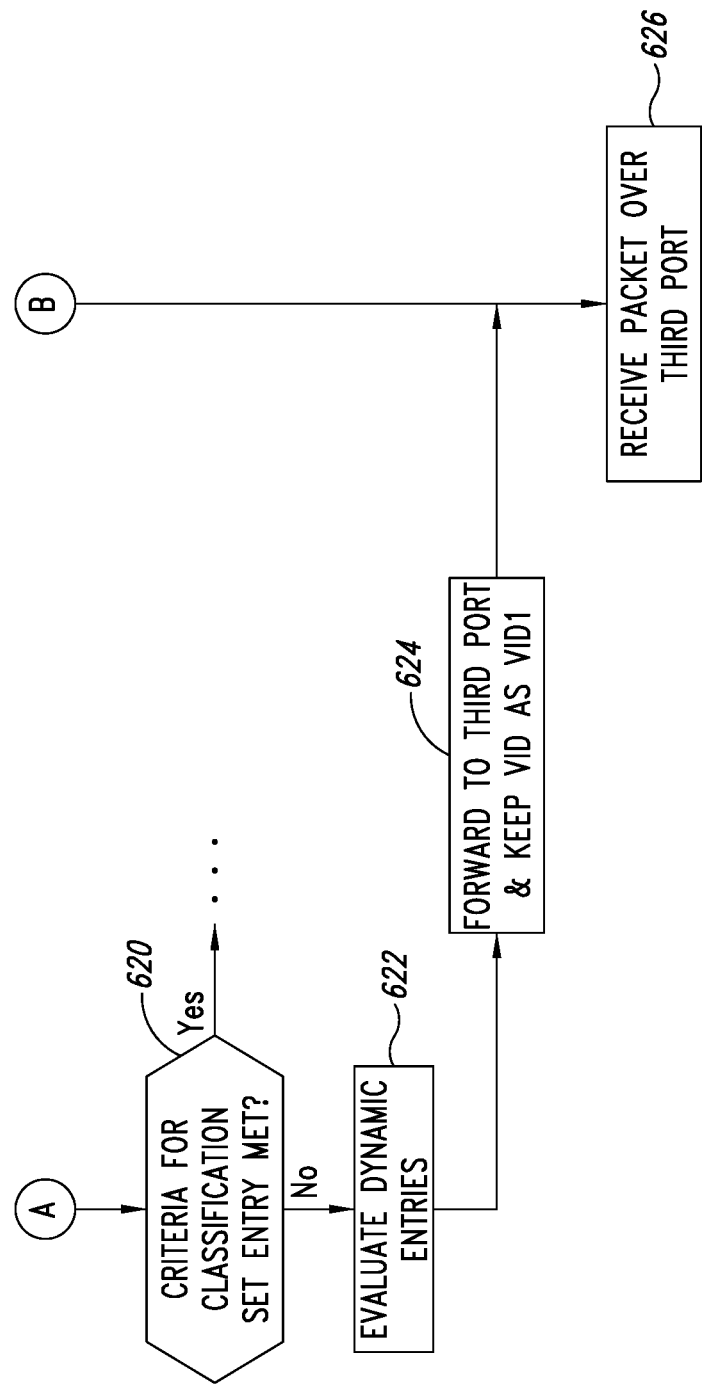

FIG. 6 shows a flow diagram of packet bridging in the network 500 described with reference to FIG. 5. The network includes the first device 102c, the second device 102d and the third device 202. At 602, the first device 102c obtains a data packet. The data packet includes a header with various fields that include a destination address of the packet, a source address of the packet, an EtherType, a VLAN ID of the packet and a priority code point (PCP) of the packet. The EtherType specifies the protocol used to encapsulate the payload of the packet. The VID specified the identity of the VLAN on which the packet is received. The priority code point specifies a priority of the packet, which may be a number between 0 and 7. For example, if the packet was received using the multipath VLAN, the VLAN ID will be VID2 and if the packet was received using the spanning tree VLAN, the VLAN ID will be VID1.

The obtained packet has the destination address of third device 202. The first device 102c (or the forwarding entity 120a or an ingress classification entity thereof) identifies the VLAN ID of the packet at 604. If necessary, the first device 102c (or the ingress classification entity thereof) then maps the VLAN ID of the data packet at 606. Mapping the VLAN ID of the packet is performed to enable the packet to cross-over during bridging from one VLAN to another VLAN and to enable all devices to be bound to the default VLAN in the bridging table. For example, if the VLAN ID is VID2, the forwarding of the packet may be constrained to paths in the network provided by the multipath VLAN. Accordingly, upon obtaining the packet, the first device 102c changes the VLAN ID of the packet from VID2 to VID1. That is because the spanning tree VLAN is the default VLAN of the network 500. The first device may always change the VLAN ID of the packet to be that of the default VLAN. If the packet is received having a VLAN ID of VID1, the VLAN ID of the packet is not changed and is kept as VID1.

At 608, the first device 102c determines if one or more criteria of the classification set entry 604a are met. If a positive determination is made, the first device 102c, at 610, forwards the packet to the second port 110b and sets the VLAN ID of the packet to VID2. The VLAN ID of the packet is set to VID2 because the packet is transmitted via the second port 110b of the first device 102c that is used for trafficking data over the multipath VLAN.

If a negative determination is made at 608, the first device 102c evaluates the dynamic entries of the packet at 612. If the packet is addressed to the second device 102d or the third device 202 and is not a priority four packet, the dynamic entry specifies that the packet is to be forwarded using the first port 110a of the first device 102c. Accordingly, at 614, the first device 102c forwards the packet to the first port 110a. Because the VLAN ID of the packet was changed at 606 to VID1 and because communication using the first port 110a is provided by the spanning tree VLAN whose VLAN ID is VID1, the VLAN ID of the packet is kept at VID1.

The second device 102d receives the packet from the first device 102c at 616. If necessary, at 618, the second device 102d remaps the VLAN ID of the packet to the default spanning tree VLAN ID of VID 1. For example, if the packet is received at the second port 110d (by virtue of the forwarding at 610), the packet will have a VLAN ID of VID2 and the VLAN ID will be remapped to VID1. However, if the packet is received at the first port 110c (by virtue of the forwarding at 614), the packet will have a VLAN ID of VID1 and the VLAN ID will not require remapping to the default VLAN ID.

At 620, the second device 102d determines if one or more criteria of the classification set entry 604b are met. In this example, the packet is addressed to the third device 202, whereas the one or more criteria require the packet to be addressed to the first device 102c to utilize the multipath VLAN. Accordingly, the packet will not meet the one or more criteria. The second device 102d, at 622, evaluates the dynamic entries 606b, 608b. The dynamic entry 606b specifies that all traffic to the third device 202 should be forwarded to the third port 110e of the second device 102d.

Accordingly, at 624, the second device 102d forwards the packet to the third port 110e. The VLAN ID of the packet is kept at VID1. At, 626, the third device 202 receives the packet at its third port 110f.

It is noted that remapping the VLAN ID of the packet enables cross-over between the two VLANs and avoids constraining packets transmitted over the multipath VLAN to the multipath VLAN. For example, without VLAN ID remapping, a priority four packet addressed to the third device 202 will be transmitted from the first device 102c to the second device 102d over the multipath VLAN. However, without VLAN remapping, the packet would not be bridged from the second device 102d to the third device over the spanning tree VLAN. That is because the dynamic entries 606b, 608b of the second device 102d apply only to VID1 packets.

Figure 7:
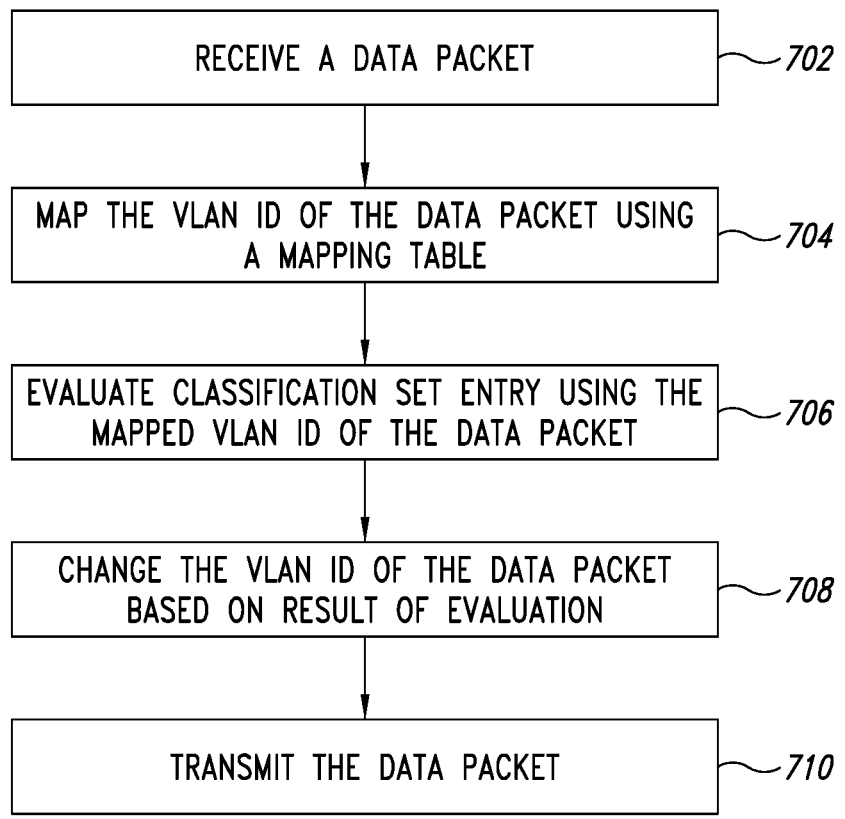
FIG. 7 shows a method for virtual local area network (VLAN) identifier (ID) remapping of a data packet.

FIG. 7 shows a method 700 for VLAN ID remapping of a data packet. In the method, a device 102 receives a data packet at 702. The device 102 maps the VLAN ID of the data packet using a mapping table at 704. Mapping the VLAN ID includes changing the VLAN ID from a VLAN ID of a multipath VLAN to a VLAN ID of a default VLAN. The device 102 then evaluates, 706, a classification set entry using the mapped VLAN ID of the data packet. At 708, the device 102 changes the VLAN ID of the data packet based on result of the evaluation. At 710, the device 102 transmits the data packet having the changed VLAN.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first port configured to receive and transmit data in accordance with a first communication protocol, the first port being part of a first virtual local area network having a first virtual local area network identifier;
a second port configured to receive and transmit data in accordance with a second communication protocol, the second port being part of a second virtual local area network having a second virtual local area network identifier, the virtual local area network being different than the first virtual local area network, the first communication protocol being different than the second communication protocol;
an ingress classification entity configured to:
receive a data packet;
identify that a virtual local area network identifier of the data packet is the first virtual local area network identifier;
determine, based on a mapping table, that the first virtual local area network identifier is to be changed to the second virtual local area network identifier; and
change the first virtual local area network identifier to the second virtual local area network identifier; and
a forwarding entity configured to forward the data packet for transmission over the first port or the second port by:
evaluating, based on the data packet, one or more criteria of a classification set entry for forwarding the data packet over the first port;
if the one or more criteria are met, forwarding the data packet over the first port and changing the virtual local area network identifier of the data packet to the first virtual local area network identifier;
evaluating, based on the data packet, a dynamic entry for forwarding the data packet over the second port; and
if the dynamic entry specifies the data packet is to be forwarded over the second port, forwarding the data packet over the second port.

2. The device of claim 1, wherein the first virtual local area network is a multipath virtual local area network and the second virtual local area network is a spanning tree virtual local area network, and the multipath virtual local area network is configured atop the spanning tree virtual local area network.

3. The device of claim 1, wherein the first port is configured to receive the data packet from a second device in a network.

4. The device of claim 1, wherein a header of the data packet includes a source address, a destination address, an indication of an ethertype, an indication of a priority associated with the data packet and the virtual local area network identifier of the data packet.

5. The device of claim 4, wherein evaluating the classification set entry includes determining whether the one or more criteria placed on at least one of the source address, destination address, indication of the ethertype, indication of the priority and the virtual local area network identifier are met.

6. The device of claim 1, wherein evaluating the dynamic entry is performed on a condition that the one or more criteria of the classification set entry are not met.

7. A method, comprising:
identifying whether a virtual local area network identifier of a data packet is a first virtual local area network identifier or a second virtual local area network identifier;
if the virtual local area network identifier of the data packet is the first virtual local area network identifier, changing the virtual local area network identifier of the data packet to the second virtual local area network identifier, the first virtual local area network identifier is an identity of a first virtual local area network that allows communication over a first port of a device and the second virtual local area network identifier is an identity of a second virtual local area network that allows communication over a second port of the device;
evaluating, based on the data packet, one or more criteria of a classification set entry for forwarding the data packet over the first port;
if the one or more criteria are met, forwarding the data packet over the first port and changing the virtual local area network identifier of the data packet to the first virtual local area network identifier; and
if the one or more criteria are not met:
evaluating, based on the data packet, a dynamic entry for forwarding the data packet over the second port; and
if the dynamic entry specifies the data packet is to be forwarded over the second port, forwarding the data packet over the second port and retaining the virtual local area network identifier of the data packet as the second virtual local area network identifier.

8. The method of claim 7, wherein first virtual local area network is a multipath virtual local area network and the second virtual local area network is a default virtual local area network.

9. The method of claim 7, further comprising:
transmitting the forwarded data packet in accordance with a first communication protocol of the first port or a second communication protocol of the second port.

10. The method of claim 9, wherein the first communication protocol and the second communication protocol are different protocols.

11. The method of claim 7, wherein a header of the data packet includes a source address, a destination address, an indication of an ethertype, an indication of a priority associated with the data packet and the virtual local area network identifier of the data packet.

12. The method of claim 11, wherein evaluating the classification set entry includes determining whether the one or more criteria placed on at least one of the source address, destination address, indication of the ethertype, indication of the priority and the virtual local area network identifier are met.

13. The method of claim 7, wherein evaluating the dynamic entry is performed on a condition that the one or more criteria of the classification set entry are not met.

14. A system, comprising:
a first device;
a second device that includes a first port configured to output a first data packet addressed to the first device, the first port being part of a first virtual local area network; and
a third device that includes:
a second port that is part of the first virtual local area network;
a third port that is part of a second virtual local area network;
an ingress classification entity configured to:
identify that a virtual local area network identifier of the first data packet is a first virtual local area network identifier of the first virtual local area network; and
changing the virtual local area network identifier of the first data packet to a second virtual local area network identifier of the second virtual local area network to enable forwarding the first data packet over the third port; and
a forwarding entity configured to receive the first data packet and forward the first data packet for transmission by:
evaluating, based on the first data packet, a dynamic entry for forwarding the data packet over the third port; and
forwarding the first data packet over the third port and retaining the virtual local area network identifier of the first data packet as the second virtual local area network identifier if the dynamic entry specifies the first data packet is to be forwarded over the third port.

15. The system of claim 14, wherein the dynamic entry is only used to forward packets over the second virtual local area network and may not be used to forward packets over the first virtual local area network.

16. The system of claim 14, wherein the forwarding entity is configured to evaluate a classification set entry for determining whether data packets are to be forwarded using the first port.

17. The system of claim 16, wherein a header of the data packet includes a source address, a destination address, an indication of an ethertype, an indication of a priority associated with the data packet and the virtual local area network identifier of the data packet.

18. The system of claim 17, wherein the forwarding entity is configured to determine whether one or more criteria placed on at least one of the source address, destination address, indication of the ethertype, indication of the priority and the virtual local area network identifier are met.

19. The system of claim 18, wherein the forwarding entity is configured to evaluate the dynamic entry on a condition that the one or more criteria are not met.

20. The system of claim 14, wherein the first virtual local area network is a multipath virtual local area network and the second virtual local area network is a default spanning tree virtual local area network.

* * * * *